United States Patent
Korpi et al.

(10) Patent No.: US 11,800,458 B2
(45) Date of Patent: Oct. 24, 2023

(54) SELECTION OF POWER CONTROL PARAMETERS

(71) Applicant: NOKIA SOLUTIONS AND NETWORKS OY, Espoo (FI)

(72) Inventors: Dani Johannes Korpi, Helsinki (FI); Martti Johannes Moisio, Perttula (FI); Karri Lindeman, Helsinki (FI); Mikko Aleksi Uusitalo, Helsinki (FI); Karthik Upadhya, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/073,847

(22) Filed: Dec. 2, 2022

(65) Prior Publication Data
US 2023/0189160 A1    Jun. 15, 2023

(30) Foreign Application Priority Data

Dec. 10, 2021   (FI) ..................... 20216265

(51) Int. Cl.
*H04W 52/22* (2009.01)
*H04W 52/24* (2009.01)
*H04W 52/14* (2009.01)

(52) U.S. Cl.
CPC ....... *H04W 52/146* (2013.01); *H04W 52/225* (2013.01); *H04W 52/24* (2013.01)

(58) Field of Classification Search
CPC . H04W 52/146; H04W 52/225; H04W 52/24; H04W 52/242; H04W 52/10; H04W 52/18
See application file for complete search history.

(56) References Cited

U.S. PATENT DOCUMENTS

| | | | |
|---|---|---|---|
| 2007/0042718 A1 | 2/2007 | Camacho et al. | |
| 2015/0141027 A1* | 5/2015 | Tsui | H04W 24/02 455/452.1 |
| 2020/0344696 A1* | 10/2020 | Vivanco | H04W 52/243 |
| 2021/0306874 A1 | 9/2021 | Bedekar | |

(Continued)

FOREIGN PATENT DOCUMENTS

| | | |
|---|---|---|
| WO | 2020/244906 A1 | 12/2020 |
| WO | 2021/223865 A1 | 11/2021 |

OTHER PUBLICATIONS

Office Action dated Apr. 19, 2022 corresponding to Finnish Patent Application No. 20216265.

(Continued)

*Primary Examiner* — John J Lee
(74) *Attorney, Agent, or Firm* — SQUIRE PATTON BOGGS (US) LLP (57) ABSTRACT

As solution for selection of power control parameters is presented. The solution comprises determining, from a given set of radio access network parameters, a selection of radio access network parameters which have an effect on uplink power control, and training a neural network to determine uplink power control parameters, utilising as an input the selection of radio access network parameter, and utilising the trained neural network, with as an input the selection of radio access network parameters, obtain as an output a set of initial uplink power control parameters.

12 Claims, 7 Drawing Sheets

(56) References Cited

U.S. PATENT DOCUMENTS

2021/0368450 A1* 11/2021 Maggi ................. H04W 52/225
2022/0217645 A1* 7/2022 Gupta ................. H04W 52/242

OTHER PUBLICATIONS

Finnish Search Report dated Apr. 19, 2022 corresponding to Finnish Patent Application No. 20216265.
Communication of Acceptance—section 29 a of Patents Decree dated Oct. 31, 2022 corresponding to Finnish Patent Application No. 20216265.
F. H. Costa Neto et al., "Uplink power control framework base on reinforcement learning for 5G networks," IEEE Trans. on Vehicular Technology, Jun. 2021, vol. 70, No. 6, pp. 5734-5748.
S. Dzulkifly et al., "Decentralized Q-learning for uplink power control," 2015 IEEE 20th International Workshop on Computer Aided Modelling and Design of Communication Links and Networks (CAMAD), Guildford, UK, Sep. 7-9, 2015, pp. 54-58.
Extended European Search Report issued in corresponding European Patent Application No. 22209616.6 dated May 4, 2023.
Carmen D'Andrea et al., "Uplink Power Control in Cell-Free Massive Mimo via Deep Learning", 2019 IEEE 8th International Workshop on Computational Advances in Multi-Sensor Adaptive Processing (CAMSAP), Dec. 15, 2019, pp. 554-558, XP033733385.

* cited by examiner

SELECTION OF POWER CONTROL PARAMETERS

CROSS REFERENCE TO RELATED APPLICATION

This application claims the benefit of Finnish Patent Application No. 20216265, filed Dec. 10, 2021. The entire content of the above-referenced application is hereby incorporated by reference.

FIELD

The exemplary and non-limiting embodiments of the invention relate generally to wireless communication systems. The exemplary and non-limiting embodiments of the invention relate especially to apparatuses and methods in wireless communication networks.

BACKGROUND

In wireless telecommunication systems, control of transmission power is an important factor. Wireless transmission of the mobile terminals and network elements typically cause interference to other transmissions of the network. Further, power consumption is a significant factor in mobile terminals which are battery-operated. However, transmission power should not be too low as the transmission quality of the wireless connections might decrease. Thus, efficient power control mechanisms are constantly developed.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1 and 6.

According to an aspect of the present invention, there is provided a system of claim 8.

According to an aspect of the present invention, there are provided methods of claims 10 and 15.

According to an aspect of the present invention, there are provided computer programs comprising instructions of claims 17 and 18.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
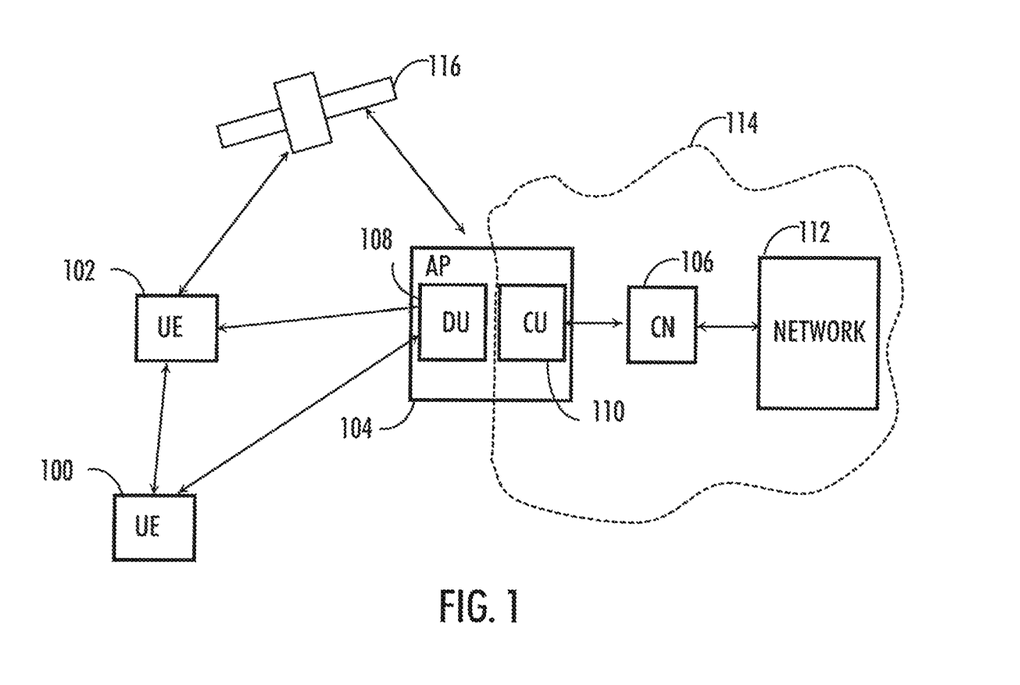
FIGS. 1 and 2 illustrate examples of simplified system architecture of communication systems.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW +P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
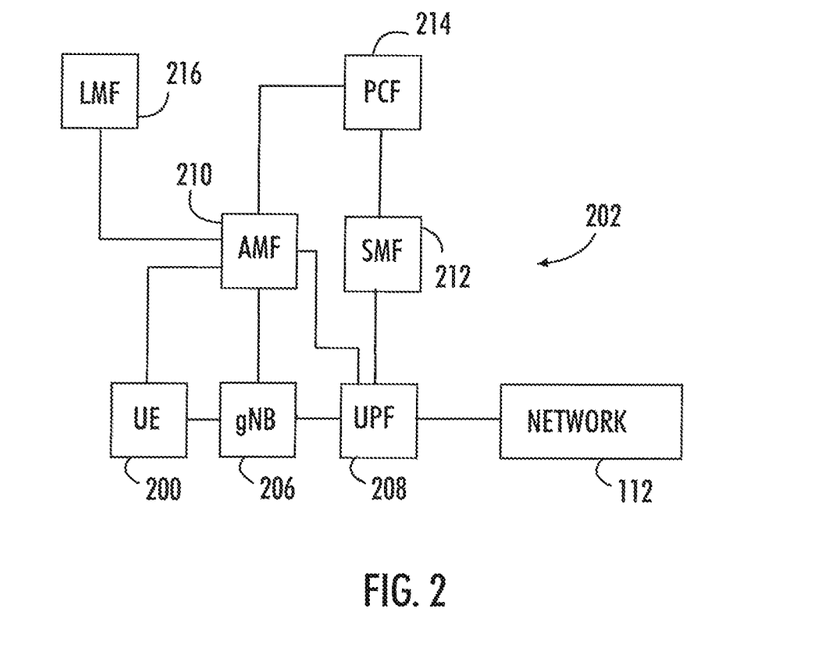

FIG. 2 illustrates an example of a communication system based on 5G network components. A terminal device, user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions. The 5G network may further comprise a location management function, LMF 216, which may be configured to determine the location of the terminal device 200 based on information received from the terminal device and/or gNB 206.

As in many wireless communication systems, also in 5G based systems there are methods for the network to control the transmission power of user equipment. The user equipment power control (uplink PC) is useful for several reasons. For example, unnecessary interference to other users may be reduced by setting a limit to the transmission (Tx) power which is not needed for reliable reception. Further, by controlling Tx power UE battery power may be saved.

5G specification describes the signalling mechanism to send Open Loop (OL) power control parameters from a base station to the user equipment. As an example, equation (1) illustrates how Physical Uplink Shared Channel (PUSCH) transmission power is set based on the signalled control parameters.

$$P_{PUSCH}=\min(P_{max}, P_0+\alpha PL+10\log_{10}(M2^\mu)+\delta_{TF}), \quad \text{(Eq.1)}$$

where $P_{PUSCH}$ is transmission power of PUSCH (unit dBm), $P_{max}$ is maximum transmission power of the device (unit dBm), $P_0$ is target received power (unit dBm), $\alpha$ is fractional pathloss compensation factor, where value 1.0 means that pathloss is fully compensated, PL is pathloss from the user equipment to the base station (unit dB), $\mu$ is subcarrier spacing related parameter, M is number of resource blocks scheduled for transmission and $\delta_{TF}$ is modulation and coding scheme related parameter.

In the above equation, the terms $P_0$ and $\alpha$ may be considered the most important.

The 5G specification supports also some enhancements for basic uplink power control (UL PC), for example closed loop correction part and possibility for dedicated UE-specific PC commands. The power control parameters are signalled with RRC signalling. The parameters are typically cell-specific, i.e., they are broadcasted per cell and hence can be different between different cells.

In 5G there are several different types of services available for users. One of the services is ultra-reliable low-latency communication (URLLC). URLLC requires both low latency (down to 1 ms one-way) and high reliability. A basic requirement is that 99.999% of the packets are received correctly and within given time budget. Another service is enhanced mobile broadband (eMBB) which provides high data rates across a wide coverage area.

One aim in uplink open loop power control is select power control parameters such that network performance may be maximised in terms of given specified key performance indicators (KPIs). It is well known that the open loop power control and thus the used PC algorithm and parameters can have a big impact on system performance. The relationship between the PC parameters and network performance is dependent on environment of the user equipment and base stations. It may be assumed that it is possible to achieve reasonable performance with fixed PC parameters for all deployments but tailoring the PC parameters for the prevailing network configuration and requirements would result in higher performance.

Further, simulations have shown that even small deviations in PC parameters can push the URLLC service to outage. This indicates extreme sensitivity of the PC parameters to URLLC latency and reliability. For this reason, such PC parameter values should be avoided which are likely to cause outages in the URLLC service or are similar to such PC parameter values.

Figure 3A:
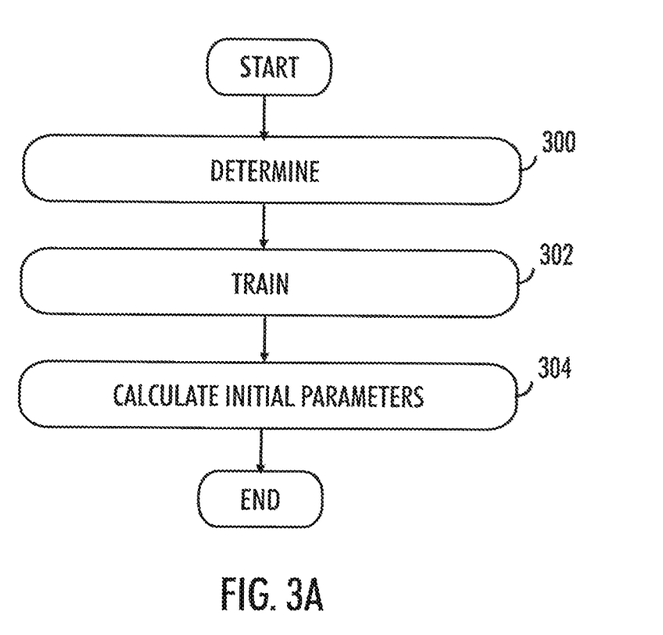
FIGS. 3A and 3B is a flowchart illustrating an embodiment of the invention.

The flowchart of FIG. 3A illustrates an embodiment. The flowchart illustrates an example of the operation of an apparatus or entity configured to train a neural network.

In step 300, the apparatus is configured to determine, from a given set of radio access network parameters, a selection of radio access network parameters which have an effect on uplink power control.

In step 302, the apparatus is configured to train a neural network to determine uplink power control parameters, utilising as an input the selection of radio access network parameters, more than one radio access network configuration, one or more types of radio access network traffic and varying radio access network conditions.

In step 304, the apparatus is configured to utilise the trained neural network, with as an input the selection of radio access network parameters, to obtain as an output as set of initial uplink power control parameters.

In an embodiment, the uplink power control parameters comprise target received power $P_0$, and a fractional pathloss compensation factor $\alpha$.

In an embodiment, the apparatus is configured to transmit the set of initial uplink power control parameters to further processing.

Figure 3B:
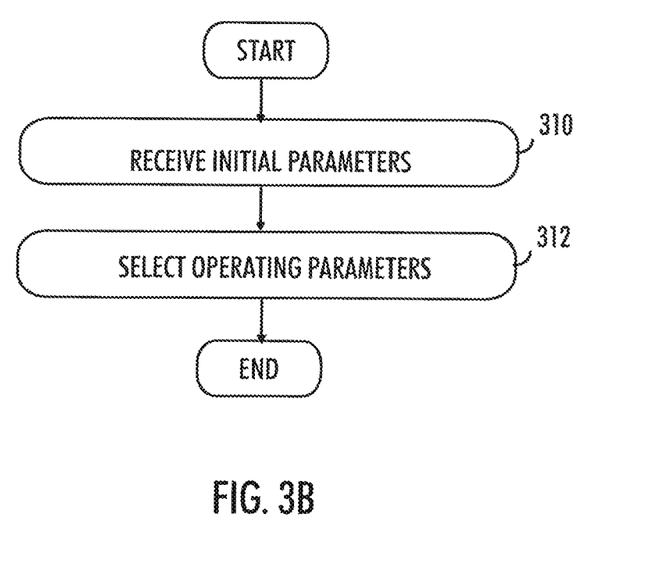

The flowchart of FIG. 3B illustrates an embodiment. The flowchart illustrates an example of the operation of an apparatus such as a base station or a gNB.

In step 310, the apparatus is configured to receive a set of initial uplink power control parameters trained by a neural network.

In step 312, the apparatus is configured to utilise the set of initial uplink power control parameters in an operating radio access network and select from the set the parameters giving best performance as the uplink power control parameters to be applied in the radio access network.

In an embodiment, when utilising the set of initial uplink power control parameters in an operating radio access network, the network element may be configured to apply each uplink power control parameter of the set a predetermined amount of time.

In an embodiment, when utilising the set of initial uplink power control parameters in an operating radio access network, the network element may be configured to monitor the performance of the network, and if the performance deteriorates, reject the current uplink power control parameters and apply utilise of the different parameters from the set of initial uplink power control parameters.

Figure 3C:
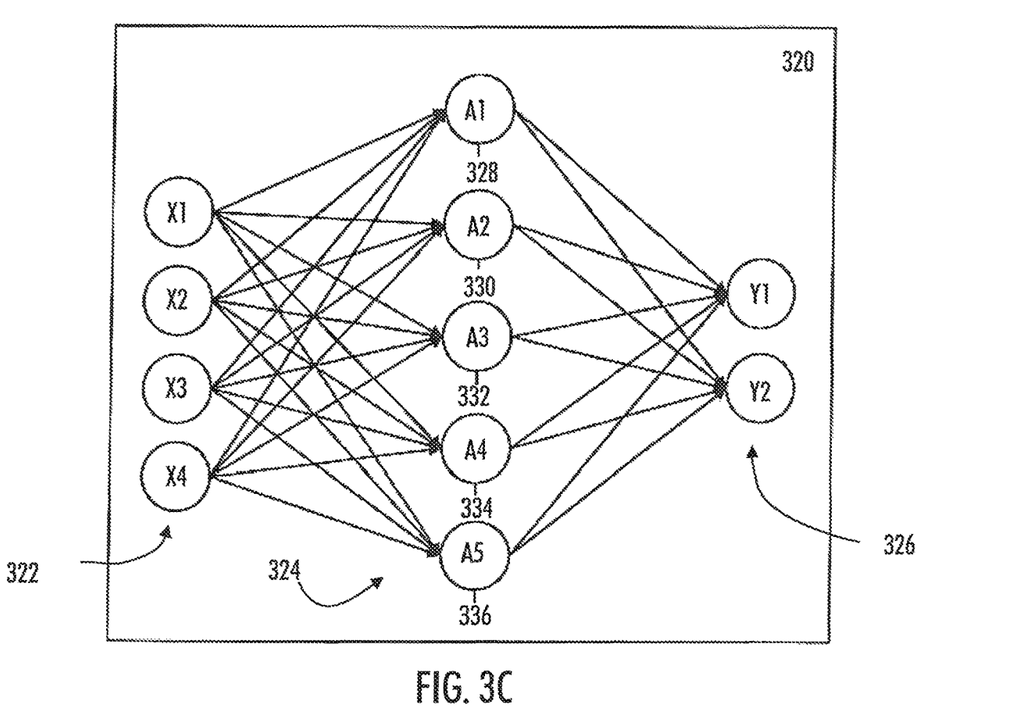
FIGS. 3C and 3D illustrate an example of neural networks.
Figure 3D:
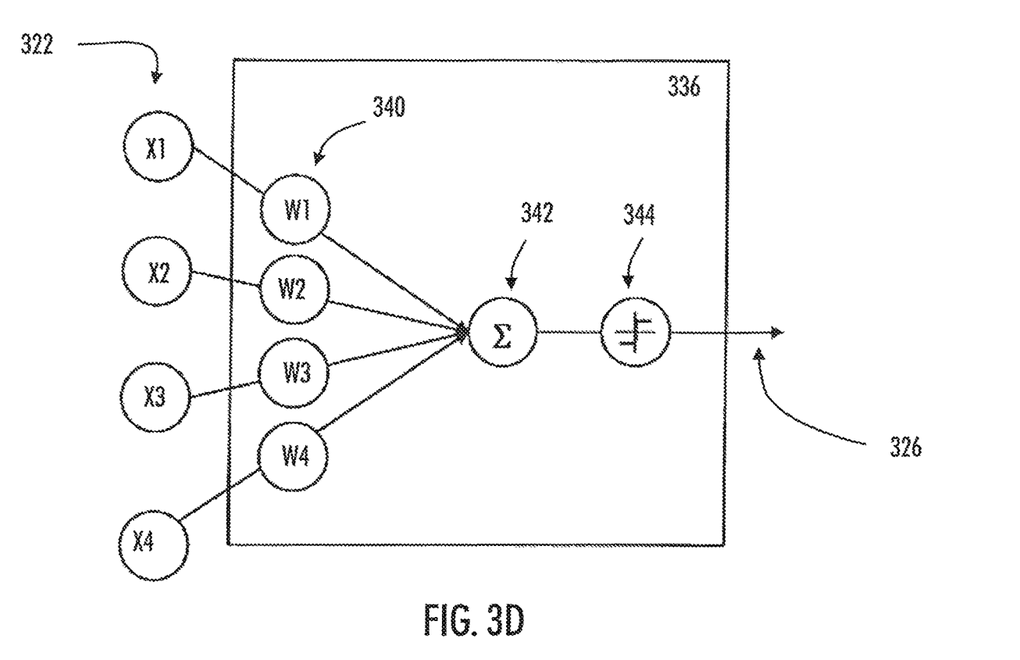

FIG. 3C illustrates an embodiment of the neural network 320 with one hidden layer, and FIG. 3D illustrates an embodiment of a computational node.

Deep learning, also known as deep structured learning or hierarchical learning, is part of a broader family of machine learning methods based on the layers used in artificial neural networks.

An artificial neural network, ANN, comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Learning by using labels is called supervised learning and learning without labels is called unsupervised learning. Deep learning typically requires a large amount of input data.

A deep neural network (DNN) 320 is an artificial neural network comprising a given number of hidden layers 324 between the input layer 322 and the output layer 326. Training of the neural network allows it to find the correct mathematical manipulation to transform the input into the proper output even when the relationship is highly non-linear and/or complicated.

In this example, each hidden layer 324 comprise nodes 328, 330, 332, 4334, 336, where the computation takes place. As shown in FIG. 3D, each node 336 combines input data 322 with a set of coefficients, or weights 340, that either amplify or dampen that input 322, thereby assigning significance to inputs 322 with regard to the task the algorithm is trying to learn. The input-weight products are added 342 and the sum is passed through an activation function 344, to determine whether and to what extent that signal should progress further through the network 320 to affect the ultimate outcome, such as an act of classification. In the process, the neural networks learn to recognize correlations between certain relevant features and optimal results.

In the case of classification, the output of deep-learning network 332 may be considered as a likelihood of a particular outcome, such as in this case a probability of given PC parameter being optimal. In this case, the number of hidden layers 324 may vary proportional to the number of used input data 322. However, when the number of input data 322 is high, the accuracy of the outcome 326 is more reliable. On the other hand, when there are fewer layers 324, the computation might take less time and thereby reduce the latency. However, this highly depends on the specific neural network architecture and/or the computational resources.

Initial weights 340 of the model can be set in various alternative ways. During the training phase they are adapted to improve the accuracy of the process based on analyzing errors in decision making. Training a model is basically a trial-and-error activity. In principle, each node 328, 330, 332, 4334, 336 of the neural network 320 makes a decision (input*weight) and then compares this decision to collected data to find out the difference to the collected data. In other words, it determines the error, based on which the weights 340 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 340 so that the next evaluation reduces the error, meaning the optimization algorithm is navigating down the gradient (or slope) of error. It is also possible to use any other suitable optimization algorithm if it provides sufficiently accurate weights 340. Consequently, the trained parameters of the neural network 320 may comprise the weights 340.

In the context of an optimization algorithm, the function used to evaluate a candidate solution (i.e. a set of weights) is referred to as the objective function. Typically, with neural networks, where the target is to minimize the error, the objective function is often referred to as a cost function or a loss function. In adjusting weights 340, any suitable method may be used as a loss function, some examples are mean squared error (MSE), maximum likelihood (MLE), and cross entropy.

As for the activation function 344 of the node 336, it defines the output 326 of that node 336 given an input or set of inputs 322. The node 336 calculates a weighted sum of inputs, perhaps adds a bias and then makes a decision as "activate" or "not activate" based on a decision threshold as a binary activation or using an activation function 344 that gives a nonlinear decision function. Any suitable activation function 344 may be used, for example sigmoid, rectified linear unit (ReLU), normalized exponential function (softmax), sotfplus, tanh, etc. In deep learning, the activation function 344 is usually set at the layer level and applies to all neurons in that layer. The output 326 is then used as input for the next node and so on until a desired solution to the original problem is found.

Figure 4:
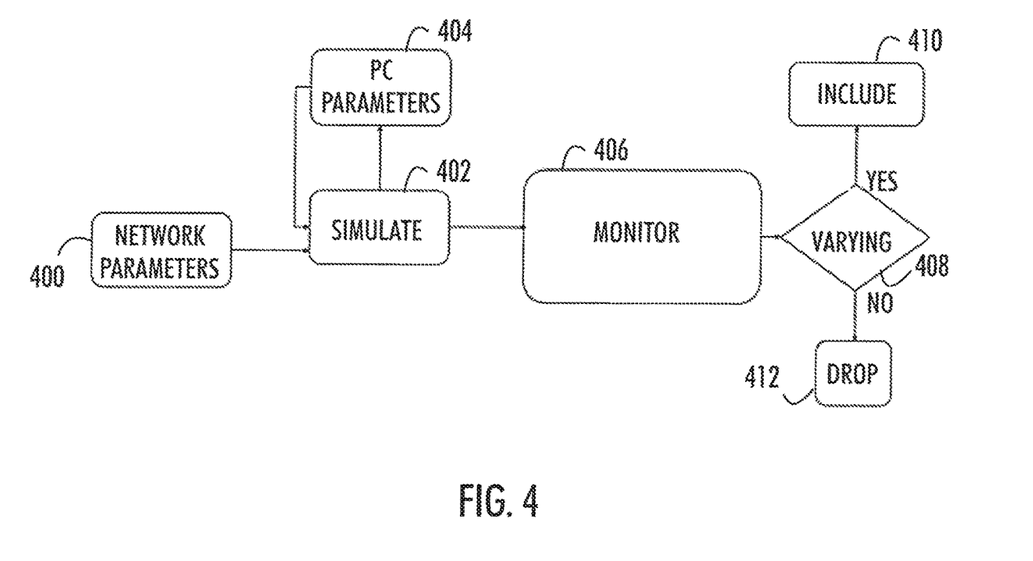
FIG. 4 illustrates an example of determining selection of radio access network parameters.

FIG. 4 illustrates an example realisation of step 300 where selection of radio access network parameters is determined.

First, a given set of radio access network parameters 400 is chosen as a starting point. These network parameters may be assumed to be such network parameters that might affect to power control parameters.

In an embodiment, the given set of radio access network parameters comprise two or more of base station positions, estimated path loss exponent, cell-specific loads, inter site distance, average number of users per cell, network center frequency and average packet size.

These radio access network parameters 400 are fed to a simulator 402 where the radio access network parameters and power control parameters 404 are simulated under different values for the chosen parameters 400 to see which of them impacts the power control parameters. The simulation is automatically monitored 406 and power control parameters are evaluated with predefined key performance indicators (KPIs). Finally, if varying a particular network parameter is determined 408 to affect to power control parameter selection, it is chosen 410 as input parameter to predict optimal power control parameters. Those network parameters, which changing values have no effect on power control parameters are discarded 412.

Figure 5:
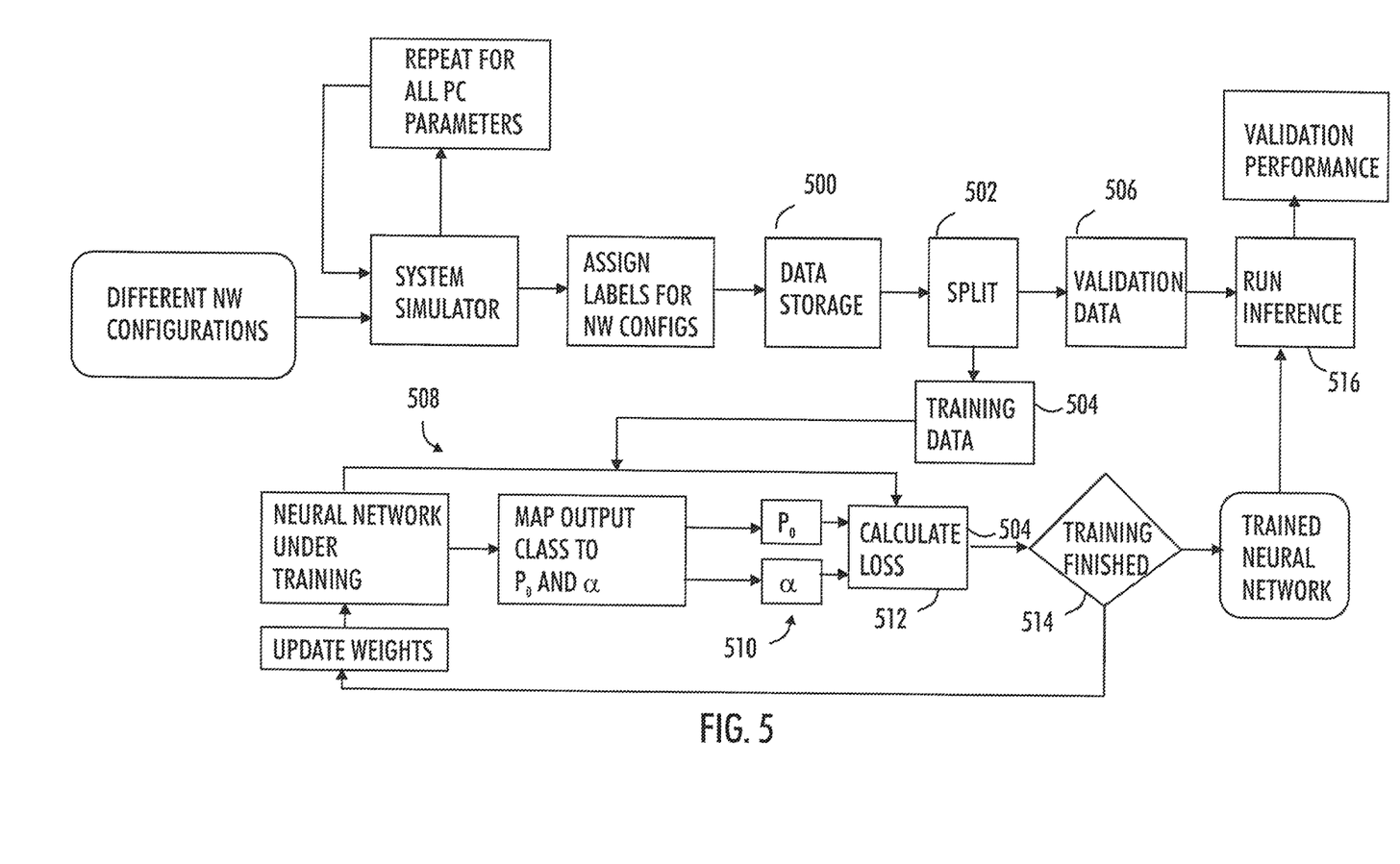
FIG. 5 illustrates an example of training of a neural network.

FIG. 5 illustrates an example realisation of the step 302 where a neural network is trained to determine uplink power control parameters.

In following it is assumed as an example that the uplink power control parameters comprise the target received power $P_0$, and the fractional pathloss compensation factor $\alpha$. However, also other parameters may be considered as one skilled in the art is well aware.

In an embodiment, to train a neural network-based power control parameter prediction algorithm, training data may be generated by simulating a network with eMBB traffic. Several different network configurations may be used, and each of them evaluated with all combinations of $P_0$ and $\alpha$. Both of these parameters are discrete parameters. This way, it is possible to evaluate otherwise identical networks with different power control parameters, and consequently determine the optimal power control parameters for each network type.

In an embodiment, the optimal PC parameters were determined by calculating the following quantity for each simulation run:

$$S = xR_{mean} + (1-x)R_{edge} \tag{Eq.2}$$

where $R_{mean}$ is normalized mean data rate, $R_{edge}$ is normalized data rate at cell edge, and x is a design parameter, having a value of 0.7, the value was chosen in order to prioritize mean bit rate over cell-edge bit rate. Both of the data rates are normalized over the interval of [0,1], to ensure that they have identical weights in the quality metric. In an embodiment, the PC parameters which give the highest value for S are considered optimal for the given network configuration.

The above metric S is an example of possible metrics. It is possible to choose also any other metric for defining the optimal network operation. The metric may be chosen based on the type of traffic the network operates under. For instance, in URLLC scenarios the latency should be reflected in the equation. An example of a quality metric for a network with a mix of eMBB and URLLC traffic may be expressed as $$S = y(xR_{mean} + (1-x)R_{edge}) + (1-y)\min\left(\frac{10^{-3}}{L_{URLLC}}, 1\right) \tag{Eq.3}$$

where $L_{URLLC}$ is the latency of URLLC traffic in seconds, and the parameter y may be chosen based on the prioritization of eMBB and URLLC. This metric would allow a neural network to learn such PC optimization where the risk of excessive latency is small, while still achieving good eMBB performance.

In an embodiment, in order to separate between different network configurations and to allow the neural network to properly learn the prediction of optimal PC parameters, the following features were used as input data for the neural network:

Inter site distance (ISD) and
Number of users/cell (load).

The use of ISD may be used an input since the uplink PC operation depends heavily on the distance between the user equipment and the base station. The balance between users at the cell edge and at cell center is crucial for the overall performance. For example, with smaller α value less compensation is given for increased pathloss which leads to smaller received power from cell edge users but on the other hand the cell edge users also cause less interference to neighbouring base station. This balance depends on ISD which impacts both the pathloss for the user but also how much interference the user generates to neighbouring cell.

The effect of load on PC parameters comes via multitude of network effects. For example, the load affects the scheduling and the amount of resource blocks allocated to UEs, which impact the power available for each resource block. In addition, the modulation and coding scheme (MCS) is impacted and of course the interference situation of the network.

As is typical in neural network-based solutions, the input may also be normalized to have unit variance before feeding it to the neural network. It may be noted that considerably more parameters may be fed to the neural network, but in this simplified example only two parameters are considered. Other potential input parameters include path loss exponent, base station positions, and cell-specific loads.

The above parameters define the input data vector, while the optimal PC parameter combination represents the label, i.e., the output of the neural network. It may be noted that each ($P_0$, α) pair may be encoded into a numerical class indicator, and therefore the neural network essentially outputs probabilities for the optimality of the different PC parameter pairs. The one with the highest probability is typically chosen as the classification result.

The training itself may be carried out by collecting the simulation data into a data storage 500. Each data sample represents an input-output pair, where the input is the chosen data vector, and the output is the optimal PC parameter pair. The collected data is split 502 into separate portions, one of which is used for training 504, and one of which is used for validating 506 the neural network's performance. The training loop 508 involves first feeding a batch of input samples through the neural network, after which the predicted class is mapped to their corresponding PC parameter values 510, and the loss with respect to the optimal PC parameter values is calculated 512. For instance, log-likelihood loss can be used to determine the value of the loss. The parameters of the neural network are then updated based on the calculated loss using stochastic gradient descent, or any of its variants. Once the training is finished 514, e.g., after reaching a predefined number of epochs/iterations, the final performance is determined by measuring 516 the prediction accuracy over the separate validation set.

Figure 6:
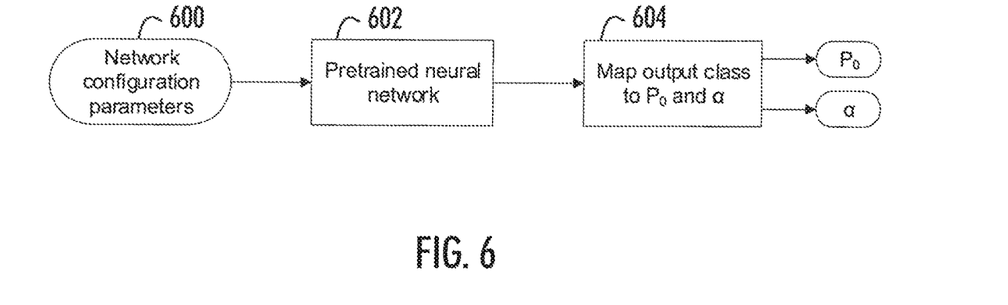
FIG. 6 illustrates an example of providing the initial uplink power control parameters.

When the neural network is trained it may be used to give initial uplink power control parameters as in step 304. FIG. 6 illustrates an example of providing the initial uplink power control parameters.

The selection of radio access network parameters 600 is taken as an input to the trained neural network 602, which is configured to determine 604 initial uplink power control parameters, in this example $P_0$, and α.

As mentioned, in general a neural network comprises an input layer, a number of hidden layers and an output layer. In an embodiment, a four-layer neural network is used for determining initial uplink power control parameters. However, also other number of layers may be used as well. In this example there are thus an input layer, two hidden layers and an output layer.

In an embodiment, the neural network comprises four layers in total, where the hidden layers utilize the rectified linear unit (ReLU) as activation function, and the output layer is fed through a sigmoid function to map the output to class probabilities. In an embodiment mentioned above, there are two input features, which are mapped into a prediction among a given number of classes, each class representing a certain combination of $P_0$ and α.

Table 1 illustrates the used neural network, to carry out the initial PC parameter prediction. It may be noted that shown values are merely an example of possible structure of the neural network.

TABLE 1

| Layer | Input size | Output size | Activation |
|---|---|---|---|
| Fully connected | 2 | 50 | ReLU |
| Fully connected | 50 | 50 | ReLU |
| Fully connected | 50 | 50 | ReLU |
| Fully connected | 50 | 9 | Sigmoid |

When the example trained neural network solution was executed and compared against selected PC values which may be considered as good default values, for test simulation data not used during training. The average results over all network configurations are shown in Table 2.

TABLE 2

|  | Mean throughput | Edge throughput |
|---|---|---|
| Gain | 1.6x | 2.0x |

The gain of the NN-based prediction is evident: on average, it can increase the total throughput of the cell by 60%, while doubling the cell edge throughput. The predicted PC parameters are beneficial for most network configurations. These simulation results show the benefit of the proposed approach. When investigating the classification accuracy of the trained neural network, it predicts the PC parameters correctly 65-80% of the time for the randomly chosen test data set, demonstrating high accuracy in choosing the optimal PC parameter pair.

In another test case irregular cells and more complicated input parameter space was considered. The following four input features were considered:
Number of users/cell (load)
Packet size
Pathloss coefficients A and B: PL=A+B log_10 (d), d=distance (km)

The packet size affects how many resource blocks are utilized in the transmission protocol. Increasing the amount of resource blocks increases the power level requirement and therefore different power control parameters are needed.

The significance of pathloss coefficients is from the fact that path loss is compensated with power control parameters and therefore it directly affects the transmit power. Too low transmit power means low bitrates especially for cell edge users. Pathloss varies in different environments, for example in city and countryside. Therefore, pathloss coefficients give information about environment.

An example of a neural network architecture for this scenario is illustrated in shown in Table 3.

TABLE 3

| Layer | Input size | Output size | Activation |
|---|---|---|---|
| Fully connected | 4 | 35 | ReLU |
| Fully connected | 35 | 35 | ReLU |

TABLE 3-continued

| Layer | Input size | Output size | Activation |
|---|---|---|---|
| Fully connected | 35 | 35 | ReLU |
| Fully connected | 35 | 19 | LogSoftmax |

As table 4 illustrates, compared against selected PC values considered as good default values, there were gains for throughputs for randomly chosen test set. The proposed neural network predicted PC parameters correctly approximately 76% of the trials.

TABLE 4

|  | Mean throughput gain (avg.) | Edge throughput gain (avg.) | L3 delay gain (avg.) |
|---|---|---|---|
| Gain | 1.4 | 1.9 | 1.9 |

Figure 7:
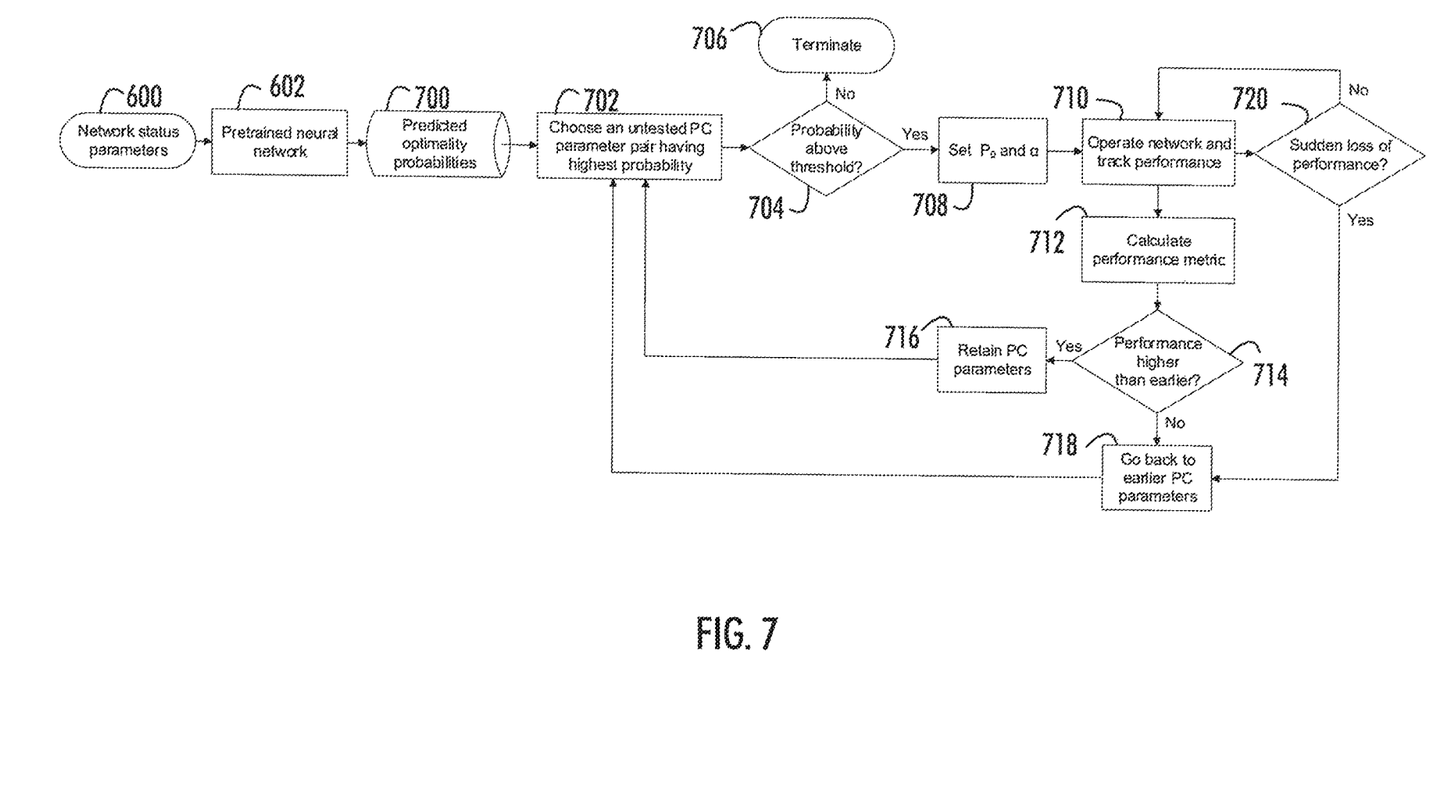
FIG. 7 illustrates an example of finetuning uplink power control parameters.

It has this been noted that the gain of the neural network-based power control parameter prediction produces good results for the simulated networks. However, it is likely that in real networks the accuracy is not quite as high. Therefore, finetuning of the output of the neural network, i.e. the initial parameters may be needed. FIG. 7 illustrates an example of possible method for finetuning the parameters.

The selection of radio access network parameters 600 is taken as an input to the trained neural network 602, which is configured to produce as an output the initial uplink power control parameters with probabilities 700. In this example the parameters are parameter pair $P_0$, and $\alpha$.

An unused power control parameter pair having the highest probability is selected 702. The probability is tested 704 against some preselected threshold value. If the probability is smaller than the threshold the process is terminated 706. Otherwise, the parameter pair is taken into use 708 and the network is operated 710 and performance of the network is tracked. Performance metrics are calculated 712 and compared 714 to metrics obtained earlier (using other parameters). If performance is higher, the present parameters are retained 716, and process continues in step 702. If not, earlier parameters, which gave better performance, are taken 718 into use. This procedure may be repeated as long as there are PC parameter candidates with probabilities higher than the threshold.

The process comprises also a safeguard in that if the performance of the system suddenly decreases 720, earlier parameters are taken 718 into use. This ensures robustness against erroneous PC parameter predictions.

Figure 8A:
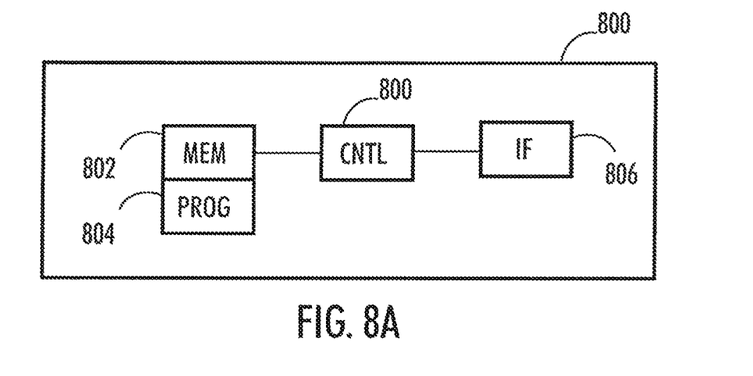
FIGS. 8A, 8B and 8C illustrate simplified examples of apparatuses applying some embodiments of the invention.
Figure 8B:
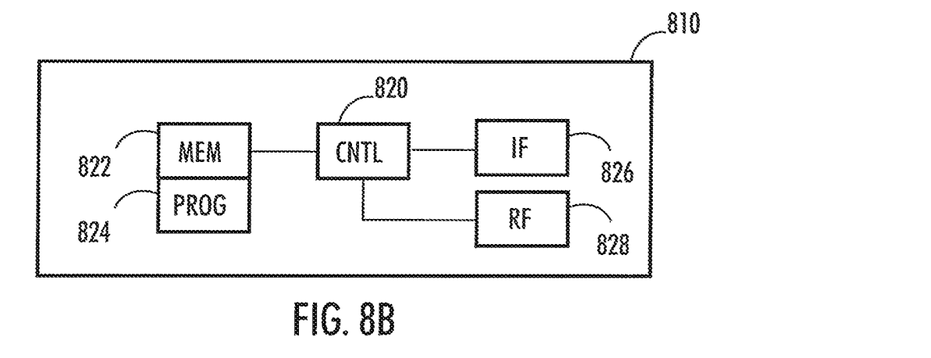
Figure 8C:
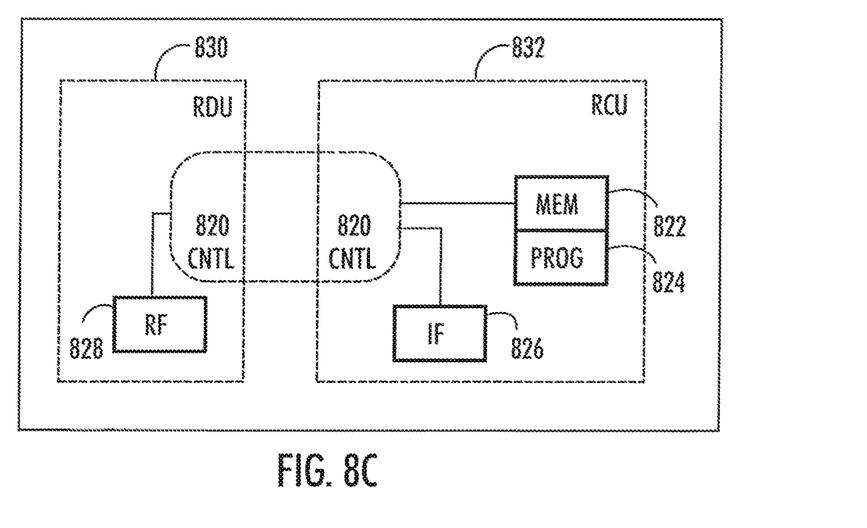

FIGS. 8A, 8B and 8C illustrate an embodiment. The figures illustrate a simplified example of an apparatuses applying embodiments of the invention.

It should be understood that the apparatuses is depicted herein as an example illustrating some embodiments. It is apparent to a person skilled in the art that the apparatuses may also comprise other functions and/or structures and not all described functions and structures are required. Although the apparatuses has been depicted as one entity, different modules and memory may be implemented in one or more physical or logical entities.

FIG. 8A illustrates an apparatus configure to train a neural network. 800 or network element applying embodiments of the invention. In some embodiments, the apparatus may be a network element or a part of a network element. In some embodiments, the apparatus may comprise several network entities connected to each other.

The apparatus 800 of the example includes a control circuitry 800 configured to control at least part of the operation of the apparatus.

The apparatus may comprise a memory 802 for storing data. Furthermore, the memory may store software 804 executable by the control circuitry 800. The memory may be integrated in the control circuitry.

The apparatus further comprises one or more interface circuitries 806 configured to connect the apparatus to other devices and to network elements of the radio access network. An interface 806 may provide a wired or wireless connection. The interface may provide a connection to the network element of FIG. 8B or 8C.

In an embodiment, the software 804 may comprise a computer program comprising program code means adapted to cause the control circuitry 800 of the apparatus to realise at least some of the embodiments described above, for example as described in connection with FIG. 3A.

FIG. 8B illustrates a network element apparatus 810 applying embodiments of the invention. In some embodiments, the apparatus may be a network element or a part of a network element. In some embodiments, the apparatus may comprise several network entities connected to each other. In an embodiment, the apparatus is a gNB or a part of a gNB.

The apparatus 810 of the example includes a control circuitry 820 configured to control at least part of the operation of the apparatus.

The apparatus may comprise a memory 822 for storing data. Furthermore, the memory may store software 824 executable by the control circuitry 820. The memory may be integrated in the control circuitry.

In an embodiment, the software 824 may comprise a computer program comprising program code means adapted to cause the control circuitry 820 of the apparatus to realise at least some of the embodiments described above, for example as described in connection with FIG. 3B The apparatus further comprises one or more interface circuitries 826 configured to connect the apparatus to other devices and to network elements of the radio access network. An interface 806 may provide a wired or wireless connection. The interface may provide a connection to the apparatus of FIG. 8A, and other network elements of a radio access system, for example.

In an embodiment, at least some of the functionalities of the network element apparatus 810 of may be shared between two physically separate devices, forming one operational entity. Therefore, the apparatus may be seen to depict the operational entity comprising one or more physically separate devices for executing at least some of the described processes. Thus, the apparatus of FIG. 8B, utilizing such shared architecture, may comprise a remote control unit RCU 830, such as a host computer or a server computer, operatively coupled (e.g. via a wireless or wired network) to a remote distributed unit RDU 832 located in the base station. In an embodiment, at least some of the described processes may be performed by the RCU 830. In an embodiment, the execution of at least some of the described processes may be shared among the RDU 832 and the RCU 830.

In an embodiment, the RCU 830 may generate a virtual network through which the RCU 830 communicates with the RDU 832. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits, ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

An embodiment provides an apparatus comprising means for determining, from a given set of radio access network parameters, a selection of radio access network parameters which have an effect on uplink power control; means for training a neural network to determine uplink power control parameters, utilising as an input the selection of radio access network parameters, more than one radio access network configuration, one or more types of radio access network traffic and varying radio access network conditions; and means for utilising the trained neural network, with as an input the selection of radio access network parameters, obtain as an output a set of initial uplink power control parameters.

An embodiment provides an apparatus comprising means for receiving a set of initial uplink power control parameters provided by a trained neural network; and means for utilising the set of initial uplink power control parameters in an operating radio access network and select from the received set the parameters giving best performance as the uplink power control parameters to be applied in the radio access network.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least one processor; and
at least one memory including computer program code,
the at least one memory and the computer program code configured to, with the at least one processor, cause the apparatus at least to perform:
determine, from a given set of radio access network parameters, a selection of radio access network parameters which have an effect on uplink power control;
train a neural network to determine uplink power control parameters, utilizing as an input the selection of radio access network parameter;
utilize the trained neural network, with as an input the selection of radio access network parameters, obtain as an output a set of initial uplink power control parameters;

when training the neural network, select a performance metric comprising at least one of the following: user equipment normalized mean data rate, normalized cell edge rate and latency; and select to the set of initial uplink power control parameters those parameters which give highest value to the selected performance metric.

2. The apparatus of claim 1, wherein the at least one memory and the computer program code are configured to, with the at least one processor, cause the apparatus further to perform:

utilize as an input in the training of the neural network at least one of the following: one or more radio access network configuration, varying radio access network conditions, network inter site distance, number of users per cell.

3. The apparatus of claim 1, wherein the uplink power control parameters comprise target received power $P_0$, and a fractional pathloss compensation factor $\alpha$.

4. An apparatus, comprising:
at least one processor; and
at least one memory including computer program code,
the at least one memory and the computer program code configured to, with the at least one processor, cause the apparatus at least to perform:
determine, from a given set of radio access network parameters, a selection of radio access network parameters which have an effect on uplink power control;
train a neural network to determine uplink power control parameters, utilizing as an input the selection of radio access network parameter;
utilize the trained neural network, with as an input the selection of radio access network parameters, obtain as an output a set of initial uplink power control parameters,
wherein given set of radio access network parameters comprise base station positions, estimated path loss exponent, cell-specific loads, inter site distance, average number of users per cell, network center frequency and average packet size.

5. A network element in a radio access network, comprising:
at least one processor; and
at least one memory including computer program code,
the at least one memory and the computer program code configured to, with the at least one processor, cause the network element at least to:
receive a set of initial uplink power control parameters provided by a trained neural network;
utilize the set of initial uplink power control parameters in an operating radio access network and select from the received set the parameters giving best performance as the uplink power control parameters to be applied in the radio access network wherein when utilizing the set of initial uplink power control parameters in an operating radio access network, apply each uplink power control parameter of the set a predetermined amount of time; and
when utilizing the set of initial uplink power control parameters in an operating radio access network, monitor the performance of the network, and if the performance deteriorates, reject the current uplink power control parameters and apply utilize of the different parameters from the set of initial uplink power control parameters.

6. A method in a radio access network, comprising:
determining, from a given set of radio access network parameters, a selection of radio access network parameters which have an effect on uplink power control;
training a neural network to determine uplink power control parameters, utilizing as an input the selection of radio access network parameters, more than one radio access network configuration, one or more types of radio access network traffic and varying radio access network conditions;
utilizing the trained neural network, with as an input the selection of radio access network parameters, obtain as an output a set of initial uplink power control parameters;
selecting, when training the neural network, a performance metric comprising at least one of the following: user equipment normalized mean data rate, normalized cell edge rate and latency; and
selecting to the set of initial uplink power control parameters those parameters which give highest value to the selected performance metric.

7. The method of claim 6, further comprising:
utilizing as an input in the training of the neural network at least one of the following: one or more radio access network configuration, varying radio access network conditions, network inter site distance, number of users per cell.

8. The method of claim 6, wherein the uplink power control parameters comprise target received power $P_0$, and a fractional pathloss compensation factor $\alpha$.

9. A method in a radio access network, comprising:
determining, from a given set of radio access network parameters, a selection of radio access network parameters which have an effect on uplink power control;
training a neural network to determine uplink power control parameters, utilizing as an input the selection of radio access network parameters, more than one radio access network configuration, one or more types of radio access network traffic and varying radio access network conditions; and
utilizing the trained neural network, with as an input the selection of radio access network parameters, obtain as an output a set of initial uplink power control parameters,
wherein the given set of radio access network parameters comprise base station positions, estimated path loss exponent, cell-specific loads, inter site distance, average number of users per cell, network center frequency and average packet size.

10. A method for a network element in a radio access network, comprising:
receiving a set of initial uplink power control parameters provided by a trained neural network;
utilizing the set of initial uplink power control parameters in an operating radio access network and select from the received set the parameters giving best performance as the uplink power control parameters to be applied in the radio access network, wherein when utilizing the set of initial uplink power control parameters in an operating radio access network, apply each uplink power control parameter of the set a predetermined amount of time;
monitoring, when utilizing the set of initial uplink power control parameters in an operating radio access network, the performance of the network; and rejecting, when the performance deteriorates, the current uplink power control parameters and apply utilize of the different parameters from the set of initial uplink power control parameters.

11. A computer program embodied on a non-transitory computer-readable medium, said computer program comprising instructions for causing an apparatus to perform at least the following:

determining, from a given set of radio access network parameters, a selection of radio access network parameters which have an effect on uplink power control;

training a neural network to determine uplink power control parameters, utilizing as an input the selection of radio access network parameters, more than one radio access network configuration, one or more types of radio access network traffic and varying radio access network conditions;

utilizing the trained neural network, with as an input the selection of radio access network parameters, obtain as an output a set of initial uplink power control parameters;

selecting, when training the neural network, a performance metric comprising at least one of the following: user equipment normalized mean data rate, normalized cell edge rate and latency; and selecting to the set of initial uplink power control parameters those parameters which give highest value to the selected performance metric.

12. A computer program embodied on a non-transitory computer-readable medium, said computer program comprising instructions for causing a network element in a radio access network to perform at least the following:

receiving a set of initial uplink power control parameters provided by a trained neural network;

utilizing the set of initial uplink power control parameters in an operating radio access network and select from the received set the parameters giving best performance as the uplink power control parameters to be applied in the radio access network, wherein when utilizing the set of initial uplink power control parameters in an operating radio access network, apply each uplink power control parameter of the set a predetermined amount of time;

monitoring, when utilizing the set of initial uplink power control parameters in an operating radio access network, the performance of the network; and rejecting, when the performance deteriorates, the current uplink power control parameters and apply utilize of the different parameters from the set of initial uplink power control parameters.

* * * * *